June 24, 1930.　　　　J. NELSON　　　　1,767,939
AUTOMATIC TRANSMISSION MECHANISM
Filed Sept. 19, 1929　　2 Sheets-Sheet 2

Inventor
John Nelson

Patented June 24, 1930

1,767,939

UNITED STATES PATENT OFFICE

JOHN NELSON, OF ERICSON, NEBRASKA

AUTOMATIC TRANSMISSION MECHANISM

Application filed September 19, 1929. Serial No. 393,720.

This invention relates to an automatic transmission mechanism and constitutes an improvement over that disclosed in my application for Letters Patent for an Automatic transmission mechanism Serial No. 347,019, filed March 14, 1929 and allowed April 30, 1929.

The present invention aims to provide a construction which will possess the advantages of that disclosed in said allowed application but which will avoid the necessity of using a heavy fly wheel and a construction in which the gears may be better held in mesh or against displacement.

A further object is to provide a construction wherein a rocking or oscillating body operates to move novel weighted governors, which may be pivotally mounted upon the frame of the vehicle.

Various additional objects and advantages will become apparent from a consideration of the description following taken in connection with accompanying drawings illustrating an operative embodiment and wherein:—

Figure 1:
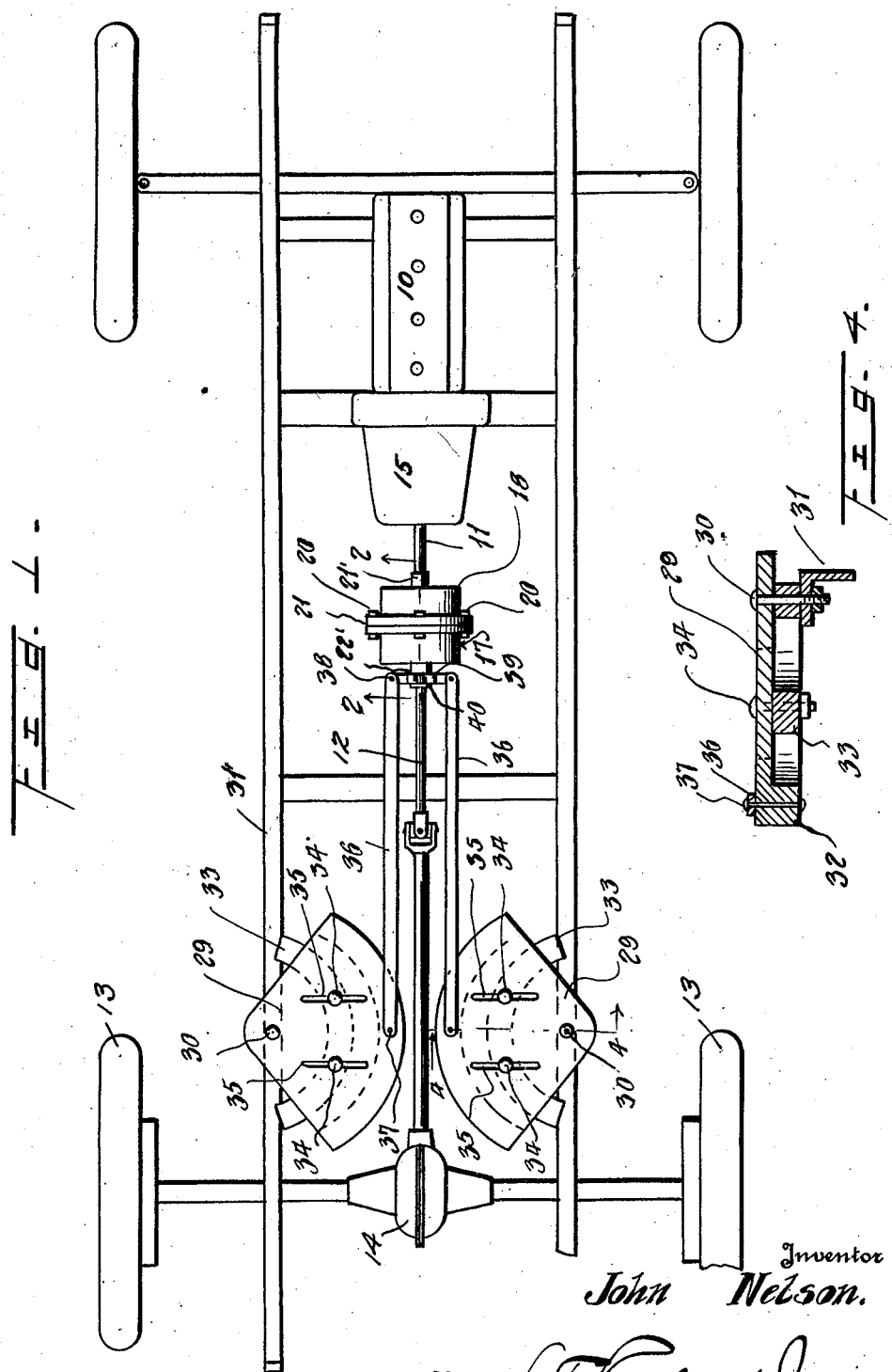
Figure 2:
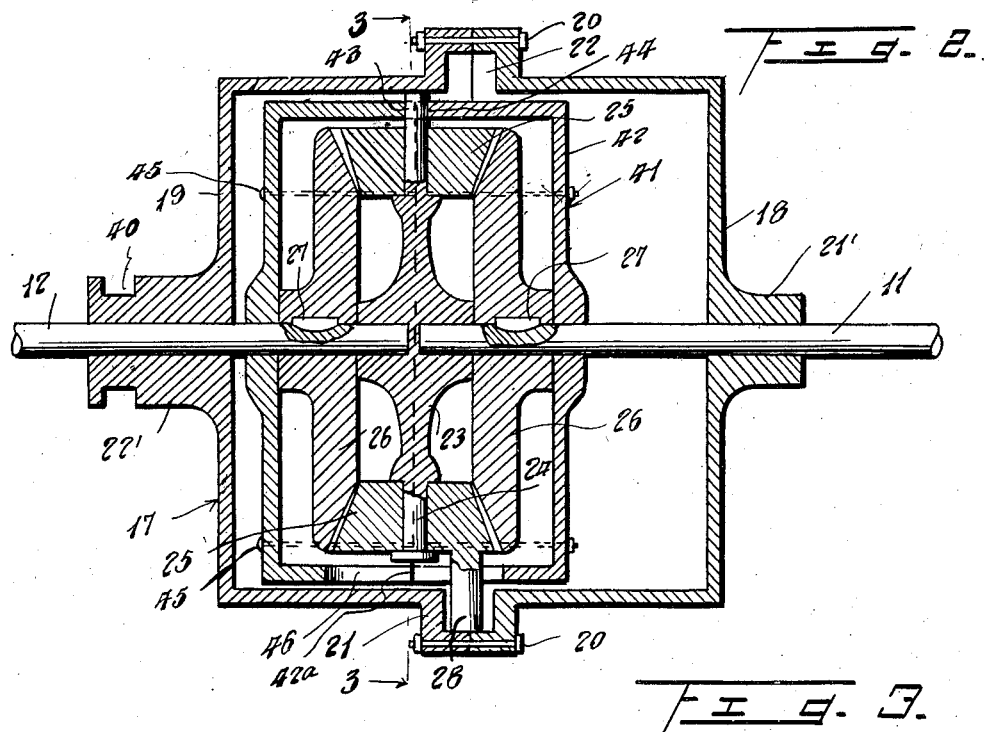
Figure 3:
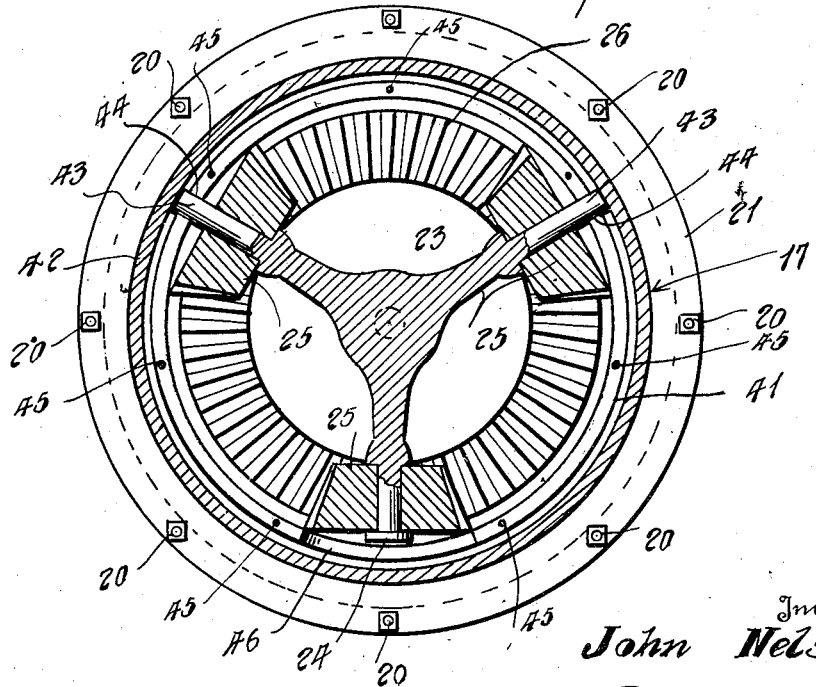

Figure 1 is a plan view of an automobile chassis showing my improvements applied, Figure 2 is a substantially central vertical longitudinal sectional view taken on the line 2—2 of Figure 1, Figure 3 is a vertical sectional view taken on the line 3—3 of Figure 2, and Figure 4 is a cross sectional view taken on the line 4—4 of Figure 1.

Referring specifically to the drawings, the improvements are shown in connection with a conventional self-propelled vehicle of which 10 is the propelling engine and 11 and 12 are the propelling shafts, being drive and driven shafts respectively, and the latter driving the rear wheels 13 through conventional differential mechanism at 14.

In a casing 15, corresponding to the usual transmission case, clutch and reverse gear mechanism is located (not being specifically shown).

The automatic transmission constituting the present improvements consists of a rocking or oscillating and sliding body or casing 17, which is used in place of the fly wheel in the aforesaid allowed application and which overcomes the necessity of providing such a heavy element as said fly wheel. The oscillating and slidable body 17 is formed of two sections 18 and 19, the two being detachably connected together as by means of bolts which pass through offset portions 21 of the sections 18 and 19 and provide a circumferential groove 22 within the casing. Such sections 18 and 19 have hubs 21' and 22' in which adjacent ends of the drive and driven shafts 11 and 12 are journaled, the casing or body 17 thus being free to rotate or turn on the axis of said shafts or sections 11 and 12. Centrally disposed within the body 17 is a spider 23 and the ends of the shaft sections 11 and 12 are loosely journaled in said spider. Said spider has radial stub shafts 24 on which several gear wheels 25 are journaled. Such gear wheels 25 are arranged in mesh with bevel gears 26 keyed at 27 to the shaft sections 11 and 12. One of said bevel gear wheels 25 has a lug 28 disposed for travel in the aforesaid slot 22.

The aforesaid construction operates similarly to that disclosed in my aforesaid allowed application but the body 17 is not relied upon to provide the necessary weight but on the contrary the same is provided by suitable governors mounted on the frame of the automobile, truck or the like as the case may be. To this end, segmental or other governor plates 29 are pivoted at 30 on vertical axes, to side beams 31 of the chassis of the vehicle, such plates having peripheral rims or flanges 32 affording considerable weight. The weight and action of the governors is adjustable and toward this end, arcuate weights 33 are adjustably fastened to the plates by bolts 34 which pass through elongated slots 35 thereof. Pitmen or links 36 are pivotally connected at 37 to the plates 29 and are also pivotally connected as at 38 to a sectional collar 39, which is loosely journaled on the hubs 22' in an annular groove 40 thereof.

It will be seen that rotating and sliding movement of the body 17 instead of being resisted by weight of the same when it is in the form of a fly wheel as in my aforesaid allowed application, such rotation and sliding movement is resisted by the governor plates 29 through the medium of the links 36.

In order to effectively hold the various gears within the casing or body 17 in mesh, a cage 41 may be provided. This cage may comprise two similar sections 42 in which the shaft sections 11 and 12 are journaled and which meet at edges 42ª collectively providing openings 44 accommodating three of the stub shafts 43 of the spider. Sections 42ª are bolted together at 45. The sections 42 abut the hubs of the gears 26 as shown.

It will be noted that in the lower portion of cage 41, it has an annular opening 46 through which the lug 28 extends and by which movement of the latter is accommodated.

Various changes may be resorted to provided they fall within the spirit and scope of the invention.

I claim as my invention:—

1. An automatic transmission comprising a balance wheel, governor means operatively connected to said balance wheel, a driving and a driven shaft section on which the balance wheel is journaled, gears keyed to said shaft sections within the balance wheel, intermediate gearing between said gears, said wheel being in sections having offset portions secured together and providing a groove, and a lug extending from the intermediate gearing into said groove to cause rocking of the balance wheel.

2. An automatic transmission comprising a balance wheel, governor means operatively connected to said balance wheel, a driving and a driven shaft section on which the balance wheel is journaled, gears keyed to said shaft sections within the balance wheel, intermediate gearing between said gears, said wheel being in sections having offset portions secured together and providing a groove, a lug extending from the intermediate gearing into said groove to cause rocking of the balance wheel, and a sectional cage mounted on said shaft sections and located within the balance wheel and surrounding said gears and gearing.

3. An automatic transmission comprising a balance wheel, governor means operatively connected to said balance wheel, a driving and a driven shaft section on which the balance wheel is journaled, gears keyed to said shaft sections within the balance wheel, intermediate gearing between said gears, said wheel being in sections having offset portions secured together and providing a groove, a lug extending from the intermediate gearing into said groove to cause rocking of the balance wheel, a sectional cage mounted on said shaft sections and located within the balance wheel and surrounding said gears and gearing, a spider for the intermediate gearing having stub shafts extending into said cage, a connection between the intermediate gearing and balance wheel to cause rocking of the latter.

4. An automatic transmission comprising a balance wheel, governor means operatively connected to said balance wheel, a driving and a driven shaft section on which the balance wheel is journaled, gears keyed to said shaft sections within the balance wheel, intermediate gearing between said gears, said wheel being in sections having offset portions secured together and providing a groove, a lug extending from the intermediate gearing into said groove to cause rocking of the balance wheel, a sectional cage mounted on said shaft sections and located within the balance wheel and surrounding said gears and gearing, a spider for the intermediate gearing having stub shafts extending into said cage, a connection between the intermediate gearing and balance wheel to cause rocking of the latter comprising a lug on the intermediate gearing, the cage having an opening through which the lug extends and in which it moves, and said wheel being in sections forming a groove at their junction engaged by said lug.

In testimony whereof I affix my signature.

JOHN NELSON.